April 28, 1964 A. W. KONCHAN Re. 25,562

PUSH BUTTON RADIATOR PRESSURE CAP

Original Filed Feb. 13, 1961 2 Sheets-Sheet 1

INVENTOR.
Anton W. Konchan

BY
Kile, Sherman, Morris, Gross & Simpson
ATTORNEYS

April 28, 1964 A. W. KONCHAN Re. 25,562

PUSH BUTTON RADIATOR PRESSURE CAP

Original Filed Feb. 13, 1961 2 Sheets-Sheet 2

INVENTOR.
Anton W. Konchan

BY
Hill, Sherman, Meroni, Gross & Simpson
ATTORNEYS

United States Patent Office

Re. 25,562
Reissued Apr. 28, 1964

25,562

PUSH BUTTON RADIATOR PRESSURE CAP

Anton W. Konchan, 6502 W. Fairfield Ave., Berwyn, Ill.

Original No. 3,086,677, dated Apr. 23, 1963, Ser. No. 88,824, Feb. 13, 1961. Application for reissue June 24, 1963, Ser. No. 291,599
15 Claims. (Cl. 220—44)

Matter enclosed in heavy brackets [ ] appears in the original patent but forms no part of this reissue specification; matter printed in italics indicates the additions made by reissue.

This invention relates to a cooling system for a liquid cooled type of engine. This invention more particularly concerns an apparatus for regulating the pressure in the cooling system and which apparatus includes a new and improved radiator pressure cap.

The radiator pressure cap described herein constitutes a modification of an earlier form of a radiator pressure cap, as shown in my Patent 2,649,986. The radiator pressure cap illustrated in this earlier patent was provided with valve means adapted to vent the radiator to atmosphere when the contents of the radiator became overheated. In other words, the valve would open and the fluid would be allowed to pass from the radiator through the overflow tube to atmosphere.

According to the present invention, a new and improved radiator pressure cap has been developed which cap is provided with valve means for venting the radiator to atmosphere and which valve means may be operated by the manipulation of a self-sealing type push button on the top side of the radiator cap. When a gasoline attendant wishes to check the water in the radiator, it is now possible for him to depress the button in order to vent the pressure within the radiator to atmosphere before he removes the cap. By providing a radiator pressure cap of this type, the cap may be more safely operated than before where there was some chance that the cap would blow off into the attendant's face when it was being taken off by him.

Another important feature of the present radiator pressure cap resides in the fact that the push button control not only functions to pressure relieve the radiator system but it also functions to seal itself in assembly with the radiator cap. By manufacturing the push button or flexible diaphragm from a self-sealing type of material, such as rubber and the like, there will be virtually no chance of the radiator pressure cap leaking during normal operation where the overheating valve is opened due to an overheating condition and hot fluid is circulated through the radiator pressure cap. The self-sealing push button prohibits the hot fluid in the cap from flowing to atmosphere at the top of the cap.

It is, therefore, an important object of the present invention to provide an improved radiator pressure cap for a radiator having a body of volatile fluid disposed therein, the cap having a push button connected to a vent valve making possible the release of excessive pressures and undesired vacuums within the radiator at the time when the cap is to be removed by the operator.

Another important object of the present invention is to provide a closure gap for a container having a body of volatile fluid contained therein, the cap being provided with a pair of oppositely acting vent valves making possible the release of both excessive pressures and undesired vacuums within the container, and a push button disposed on the closure cap for manual operation and which push button is connected to one of said valves making possible the release of excessive pressures and undesired vacuums before the cap is removed.

It is a further object of the present invention to provide a radiator pressure cap having signal means for the operator that a pressure condition exists in the radiator system so that injury will not be caused to the operator by his removing the cap from the radiator until this pressure has been eliminated.

Yet another object of the present invention is to provide self-sealing manually operable means which may be actuated by the exertion of finger pressure by the operator against the means to cause the excessive pressure in the radiator to be discharged to atmosphere.

At the outset, it will be understood that while the present invention has been described as being associated with the engine of an automobile that the apparatus embodying my invention may be associated with other engines or systems, if desired.

Figure 2:
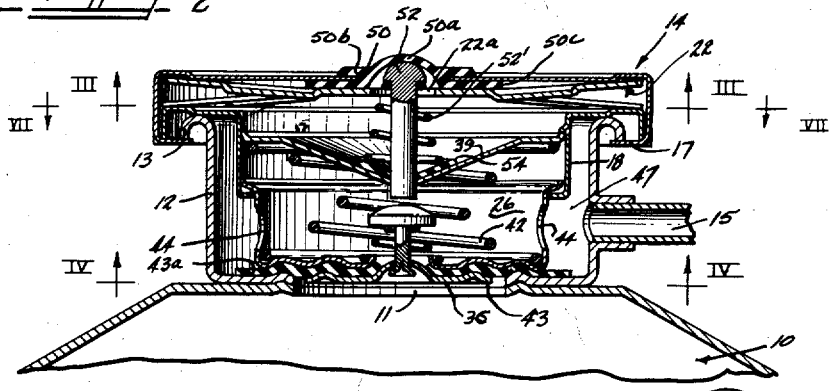
FIGURE 2 is an enlarged fragmentary vertical section taken substantially on the line II—II looking in the direction indicated by the arrows, as seen in FIGURE 1.
Figure 3:
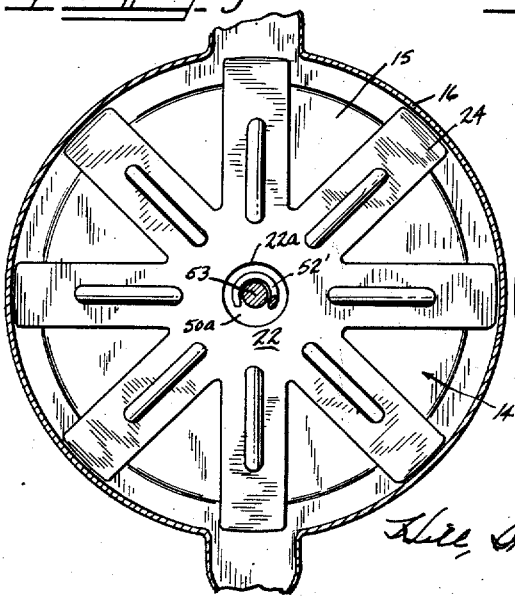
FIGURE 3 is an enlarged fragmentary cross-sectional view taken substantially on the line III—III looking in the direction indicated by the arrows, as seen in FIGURE 2.
Figure 4:
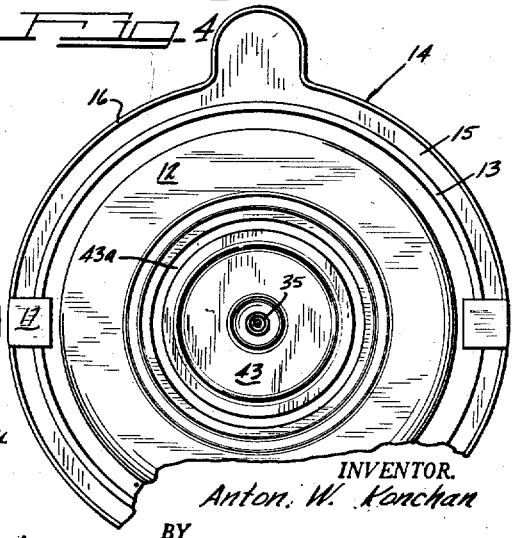
FIGURE 4 is an enlarged fragmentary cross-sectional view taken substantially on the line IV—IV looking in the direction indicated by the arrows, as seen in FIGURE 2.

In FIGURE 2, reference numeral 10 refers generally to a container, such as a radiator for internal combustion engines having a filling aperture 11 surrounded by an upwardly extending, generally cylindrical filler neck 12 secured to the container 10 and which has a neck opening for registry with the aperture 11. The filler neck 12 is provided with a depending, concentric outer camming surface 13 for receiving a radiator pressure cap or closure cap 14 of the present invention, as is well known in the art.

Figure 1:
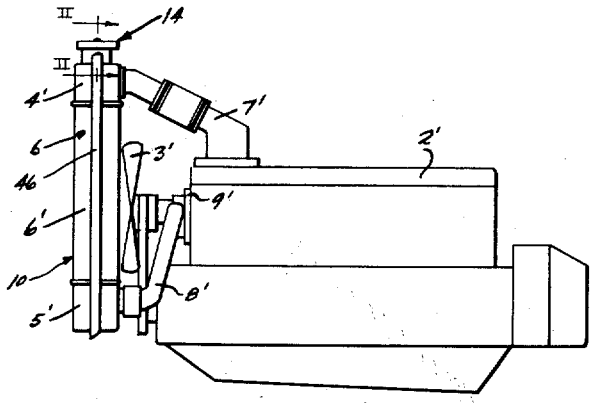
FIGURE 1 is a side elevation of a vehicle engine and its liquid cooling system.

In FIGURE 1 an engine is identified at 2'. The engine 2' is adapted to rotate a fan 3'. The radiator 10 is mounted on the engine. The engine 2' includes an upper header or tank 4' as well as a lower header or tank 5'. A connecting structure 6' joins the tanks 4' and 5'. The connecting structure is comprised of a plurality of liquid passages communicating the tanks 4' and 4' together as well as a series of air passages therethrough. Mounted on the radiator 10 is a radiator pressure cap or a closure cap 14, which embodies a number of the features of the present invention. The headers 4' and 5' are joined with the engine 2' by means of suitable tubular conduits 7' and 8'. A water pump 9' is provided and the pump is adapted to be driven by the engine so that liquid coolant is forced to circuate through the engine 2' into the conduit 7' and downwardly through the radiator 10 whereupon the fluid is returned by means of the conduit 8' to the engine.

The closure member 14 of the present invention comprises a generally cylindrical cap 15 provided with a depending, annular marginal flange 16 having opposing inwardly deformable securing tabs 17 for contacting the camming surface 21.

A generally cylindrical body housing 18 is adapted to be mounted to depend from the cap 15, the housing 18 having a lower inwardly directed peripheral rim 19 and a radially outwardly extending peripheral rim 20 terminating in a depending annular flange edge 21. A spring diaphragm 22 having a central downwardly dished portion 23 and radially outwardly extending deflectable arms 24 is adapted to be interposed between the cap 15 and the body housing 18, alternate deflectable arms 24 contacting the cap and the body housing, respectively. The body housing is secured within the cap 15 in nested, concentric, radially spaced relation by the radially inward deformation of the tabs 17 of the cap to underlie the annular flange 21 of the spring housing.

A pressure valve 26, in the form of a cupped member having an upper, outer, radially directed peripheral rim 27; an upper cup portion 28; and intermediate, radially directed seating flange 29; a lower cylindrical cupped portion 30; a lower radially extending portion 31; and a central upstanding embossment or turned annular flange 32, is provided to be telescoped within the body housing 18. The upper peripheral rim 27 of the valve 26 is adapted to be seated on the inwardly directed rim 19 of the spring housing 18 with the remainder of the cupped valve 26 depending from the spring housing. The central lower embossment 32 of the valve 26 is provided with a central aperture 33 and a surrounding upwardly dished frustoconical face 34. Underlying the portion 31 is a metal valve closure 43 and which has an upwardly dished directed valve sealing face or seat 43c disposed about a central aperture 43d. A correspondingly shaped split end valve head 35 of a vacuum valve 36 is urged against the seat 43c by means of a spring 37 acting against the lower radial portion 31 of the valve 26.

A spring cap 39 is also provided to be telescoped within the spring housing 18 in spaced relation to the valve 26, the spring cap having a depending marginal annular flange or annular vertical edge 40 concentric with and surrounding a downwardly dished center portion 41. The edge 40 is secured in assembly with the housing 18 by means of three annularly arranged struck out housing flanges 40a.

A pressure valve compression spring 42 is adapted to be confined between the spring cap 39, and the pressure valve 26, the valve spring 42 surrounding the dished portion 41 of the spring cap and being seated upon the inner radially extending portion 31 of the pressure valve 26. A pressure valve gasket 43a is provided to abut the underside radially extending portion 31 of the pressure valve 26 and to abut the top side of the metal valve closure 43. The gasket 43a coacts with the split end 35 and the valve seat 43c to form the vacuum valve 36.

Figure 6:
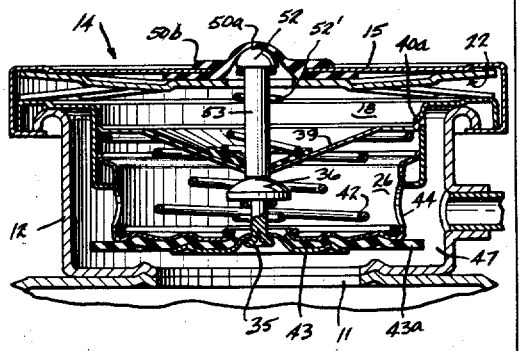
FIGURE 6 is an enlarged fragmentary cross-sectional view similar to FIGURE 5 only showing the automatic operation of the valve when an excessive pressure condition exists within the cooling system.
Figure 7:
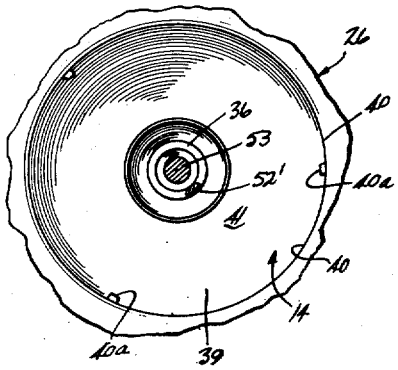
FIGURE 7 is a fragmentary cross-sectional view taken substantially on the line VII—VII looking in the direction indicated by the arrows, as seen in FIGURE 2.

The operation of the closure member 14 will be appreciated from the foregoing disclosure and the illustrations of FIGURES 2 and 6 in which it will be seen that the inwardly directed tabs 17 of the cap 15 are adapted to engage the camming surface 13 of the neck 12 to secure the closure member thereto upon relative rotation of the closure member.

The pressure valve 26 urges the gasket flange edge 21 into sealing relation with the neck 12 to overlie the filling aperture 11 of the container 10. The edge 21 is urged into effective sealing relation by means of the compression spring 42 and the edge 21 is likewise resiliently urged into sealing relation with the neck by means of the spring diaphragm 37 acting against the body housing 18.

It will be seen that upon the development of excessive pressure within the container 10, as upon the volatilization of coolant upon overheating within a radiator, these pressures will urge the valve 26 and the gasket 43a from sealing contact with radiator neck 12 at the area of the aperture 11 against the action of the compression spring

42 to admit fluid or vapor into the spring housing 18. Egress for fluid or vapor from the interior of the spring housing 18 is provided by means of a radial aperture 44 formed in one cylindrical side wall of the spring housing and communicating with an apertured vent nipple 45 formed in the neck 12 and communicating with a vent conduit or overflow tube 46. Actually the concentric body housing 18 and the neck 12 cooperate to define an annular chamber 47 lying therebetween and communicating with the interior of the housing 18 and the vent aperture 45, obviating the necessity of radially aligning the apertures 44 and 45 as shown in FIGURE 2. It will be seen that the valve 26 is of appreciable size and permits also the overflow of coolant liquid if necessary, as upon boiling and actual eruption of liquid from the radiator.

Upon the generation of a partial vacuum within the container 10, the vacuum valve 36 opens against its compression spring 37 to vent atmophesric pressures to the interior of the container 10 through the vent conduit 46, the nipple 45, and the spring housing aperture 44.

Figure 8:
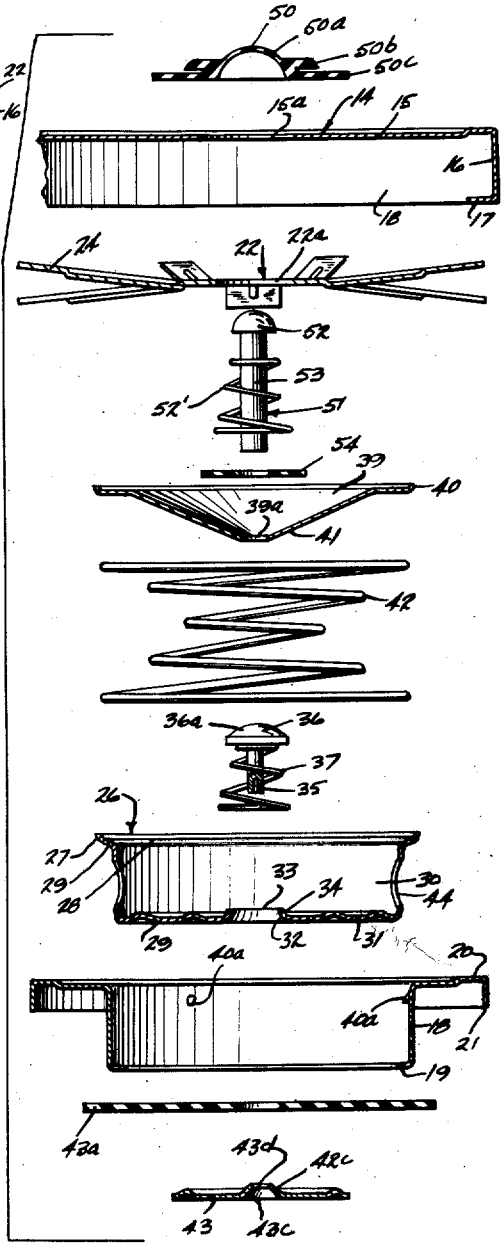
FIGURE 8 is an exploded view of the components of my radiator pressure cap.

In accordance with certain of the more important features of the present invention, a resiliently deflectable diaphragm 50 is mounted on the cap 15. The diaphragm may be made of any suitable material such as a synthetic plastic or rubber material or a natural rubber material. The diaphragm 50 has a bulb-shaped depressible portion 50a. The diaphragm further has axially spaced annular flanges 50b and 50c which are concentrically disposed relative to the bulb-shaped portion 50a. As will be seen in FIGURE 8, for example, the cap 15 has a central annular flange 15a defining a central opening. The diaphragm flanges 50b and 50c are adapted to be disposed on axially opposite sides of the annular flange 15a to provide a closure for the opening defined by the cap flange 15a.

A vacuum valve actuator or push rod 51 has been provided. This actuator 51 has an enlarged head 52 which is configurated so as to be slightly smaller than the configuration of the bulb-shaped portion 50a of the diaphragm 50. Secured with the actuator 51 is a compression spring 52' which is coiled about a stem portion 53 of the actuator. A rubber or plastic gasket 54 is provided and which is adapted for disposition about the lower end of the stem 53 and the spring 52 is adapted to bear against the gasket 54.

The leaf spring 22 and the spring cap 39 have a spring opening 22a and a cap opening 39a. These openings are of sufficient size so that the stem 53 of the actuator may pass readily therethrough. When the components of the cap 14 are in assembly with one another the bulb-shaped head 52 of the actuator 51 is adapted to be disposed within the cavity defined by the bulb-shaped portion. The stem 53 is adapted to extend through the leaf spring opening 22a, through the cap opening 39a generally axially of the spring 42 with its lower end being disposed in slightly spaced axial relation with respect to an enlarged head 36a of the valve 36. The action of the spring 52' is such that it tends to hold the bulb-shaped portion 52 within the cavity defined by the diaphragm 50 so that the lower end of the stem 53 is axially spaced from the head portion 36a of the valve member 36.

When the valve 26 is actuated so that the gasket 43a is elevated off of the neck 12, as shown in FIGURE 6, the valve member 36 contacts the lower end of the stem 53 and forces it vertically upwardly so that the enlarged head portion of the actuator 51 is urged against the bulb-shaped portion 50a of the diaphragm which causes the portion 50a to flex axially away from the cap 15. When an operator is called upon to check the condition of the radiator, he will be readily able to see that the radiator is under high pressure and that the radiator closure cap 14 should not be opened until such condition is alleviated.

Figure 5:
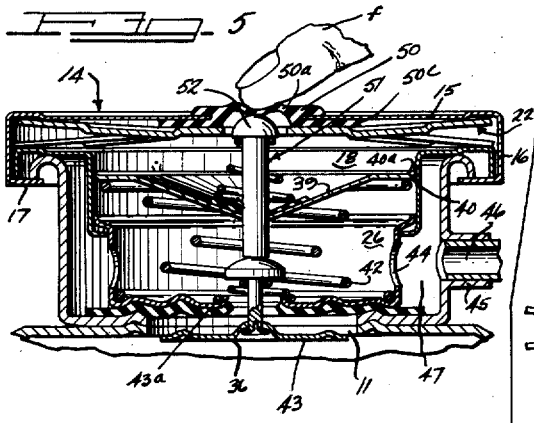
FIGURE 5 is a vertical section similar to FIGURE 2 only illustrating how the self-sealing diaphragm may be manually operated to open the valve to pressure relieve the radiator system.

The excess pressure within the radiator system may be relieved by the operator by applying his finger f against the bulb-shaped portion 50a, as shown in FIGURE 5.

This action causes the actuator 51 to be actuated against the valve member 36 to cause the vacuum valve closure 43 to open so that the pressure within the radiator may be equalized with the atmospheric pressure externally of the radiator. When the operator releases his finger the spring 52' will automatically return the actuator 51 to its normal position as shown in FIGURE 2.

It will thus be seen that I have provided an improved form of closure for a receptacle or container, such as an internal combustion engine radiator containing a body of volatile coolant, such as water or water containing alcohol or other freezing point depressants. The closure provides means for venting both excessive pressures and vacuums developed within the receptacle to the atmosphere to maintain the pressure within the receptacle within rather narrowly defined limits. The structure is simple and economical in manufacture and assembly and the venting pressures may be varied through a wide range during assembly of the closure to accommodate various types of receptacles at varying desired pressures within the receptacle.

It will be understood that modifications and variations may be effected without departing from the scope of the novel concepts of the present invention.

I claim as my invention:

1. In a closure cap for attachment to the filling neck of an internal combustion engine radiator, means for venting excessive pressures developed in said radiator through a vent provided in said neck, comprising a generally cylindrical body housing sealingly engaging said neck, a pressure valve carried by said housing for telescoping movement relative thereto into and out of sealing engagement with said radiator, a spring cap secured integral within said housing in adjusted spaced relation to said valve, a spring acting between said cap and said valve urging said valve into engagement wtih said radiator, said valve being actuated against said spring by excessive pressures developed within said radiator to vent the same through said neck vent, a spring urged vacuum valve carried by said pressure valve for venting the interior of said radiator to atmospheric pressure through said neck vent upon the development of sub-atmospheric pressures in said radiator, a closure member for detachable assembly on a neck of a radiator and having a central opening, a resiliently deflectable diaphragm coaxially aligned with said central opening on said closure member and having diaphragm flanges engaged on axially opposite sides of said closure member in sealed assembly therewith, and actuator means including a push rod operatively disposed between the diaphragm and said vacuum valve with the diaphragm being manually depressible against said push rod and acting through said actuator means to open said vacuum valve and vent a radiator to atmosphere.

2. In a closure cap for attachment to the filling neck of an internal combustion engine radiator, means for venting excessive pressures developed in said radiator through a vent provided in said neck, comprising a generally cylindrical body housing sealingly engaging said neck, a pressure valve carried by said housing for telescoping movement relative thereto into and out of sealing engagement with said radiator, a spring cap secured integral within said housing in adjusted spaced relation to said vlave, a spring acting between said cap and said valve urging said valve into engagement with said radiator, said valve being actuated against said spring by excessive pressures developed within said radiator to vent the same through said neck vent, a spring urged vacuum valve carried by said pressure valve for venting the interior of said radiator to atmospheric pressure through said neck vent upon the development of sub-atmospheric pressures in said radiator, a closure member for detachable assembly on a neck of a radiator and having a central opening, a resiliently deflectable diaphragm coaxially aligned with said central opening on said closure member and having diaphragm flanges engaged on axially opposite sides of said closure member in sealed assembly therewith, and actuator means including a push rod operatively disposed between the diaphragm and said vacuum valve with the diaphragm being manually depressible against said push rod and acting through said actuator means to open said vacuum valve and vent radiator to atmosphere, said resiliently deflectable diaphragm being comprised of a synthetic material and being in self-sealing assembly with the closure member to prohibit fluid and pressure leaks, said diaphragm having a depressible bulb portion of uniform thickness disposed centrally of said diaphragm flanges and with said push rod engageable therewith.

3. In a closure cap for attachment to the filling neck of an internal combustion engine radiator, means for venting excessive pressures developed in said radiator through a vent provided in said neck, comprising a generally cylindrical body housing sealingly engaging said neck, a pressure valve carried by said housing for telescoping movement relative thereto into and out of sealing engagement with said radiator, a spring cap secured integral within said housing in adjusted spaced relation to said valve, a spring acting between said cap and said valve urging said valve into engagement with said radiator, said valve being actuated against said spring by excessive pressures developed within said radiator to vent the same through said neck vent, a spring urged vacuum valve carried by said pressure valve for venting the interior of said radiator to atmospheric pressure through said neck vent upon the development of sub-atmospheric pressures in said radiator, a closure member for detachable assembly on a neck of a radiator and having a central opening, a resiliently deflectable diaphragm coaxially aligned with said central opening on said closure member and having diaphragm flanges engaged on axially opposite sides of said closure member in sealed assembly therewith, and actuator means including a push rod operatively disposed between the diaphragm and said vacuum valve with the diaphragm being manually depressible against said push rod and acting through said actuator means to open said vacuum valve and vent a radiator to atmosphere, said means including a spring urged actuator with one end being engageable by said diaphragm and with an opposite end extended through said spring cap and for engagement with said vacuum valve.

4. In a closure cap for attachment to the filling neck of an internal combustion engine radiator, means for venting excessive pressures developed in said radiator through a vent provided in said neck, comprising a generally cylindrical body housing sealingly engaging said neck, a spring cap secured integral within said housing between its opposite ends, a spring urged vacuum valve carried by said cylindrical body housing for venting the interior of said radiator to atmospheric pressure through said neck vent upon the development of sub-atmospheric pressures in said radiator, a closure member for detachable assembly on a neck of a radiator and having a central opening, a resiliently deflectable diaphragm coaxially aligned with said central opening on said closure member and having diaphragm flanges engaged on axially opposite sides of said closure member in sealed assembly therewith, and actuator means including a push rod operatively disposed between the diaphragm and said vacuum valve with the diaphram being manually depressible against said push rod and acting through said actuator means to open said vacuum valve and vent a radiator to atmosphere, said resiliently deflectable diaphragm being comprised of a synthetic material and being in self-sealing assembly with the closure member to prohibit fluid and pressure leaks.

5. In a closure cap for attachment to the filling neck of an internal combustion engine radiator, means for venting excessive pressures developed in said radiator through a vent provided in said neck, comprising a generally cylindrical body housing sealingly engaging said neck, a spring cap secured integral within said housing between its opposite ends, a spring urged vacuum valve carried by said cylindrical body housing for venting the interior of said radiator at atmospheric pressure through said neck vent upon development of sub-atmospheric pressures in said radiator, a closure member for detachable assembly on a neck of a radiator and having a central opening, a resiliently deflectable diaphragm coaxially aligned with said central opening on said closure member and having diaphragm flanges engaged on axially opposite sides of said closure member in sealed assembly therewith, and actuator means including a push rod operatively disposed between the diaphragm and said vacuum valve with the diaphragm being manually depressible against said push rod and acting through said actuator means to open said vacuum valve and vent a radiator to atmosphere, said resiliently deflectable diaphragm being comprised of a synthetic material and being in self-sealing assembly with the closure member to prohibit fluid and pressure leaks, and actuator means operatively disposed between the diaphragm and said vacuum valve with the diaphragm being manually depressible and acting through said actuator means to open said vacuum valve and vent a radiator to atmosphere, said actuator means including a spring urged actuator with one end being engageable by said diaphragm and with an opposite end extended through said spring cap and for engagement with said vacuum valve.

6. In a closure cap structure for attachment to a tubular filling neck having an overflow exhaust and a neck opening for an internal combustion engine radiator, a generally cylindrical cap having an annular flange defining a central cap opening and a flexible diaphragm having pressure seal means on its margin gripping said annular flange and sealing the cap opening, said cap being provided with an axially depending annular marginal flange at its outer margin with an axially inner end of the marginal flange carrying securing tabs for retaining engagement with a filler neck, a generally cylindrical tubular dished body housing having an outer margin at an upper end in axially lapped relation to said securing tabs securing the cap and the housing in assembly and with said housing having a radially inturned lower end, a spring between said cap and said outer margin of said body housing urging said outer margin towards said tabs, a tubular spring cap secured in said dished body housing, a cupped tubular member having a peripheral rim carried on said radially inturned lower end of said body housing and having a radially directed seating flange disposed about a seating flange opening, a ring gasket carried on the underside of said seating flange for closing a neck opening in a filling neck, a valve closure underlying said gasket and movable into and out of engagement therewith, a vacuum valve having a stem secured at one end with said valve closure and movable in said seating flange opening, a spring mounted on said seating flange and extending upwardly in engagement with said valve drawing said valve closure against said gasket, a spring between said spring cap and said seating flange for holding said gasket in engagement with a filler neck over its neck opening, and a push rod having one end operatively engageable by said flexible diaphragm and an opposite end operatively engageable with said vacuum valve for disengaging said valve closure about said seating flange opening to permit excess pressure to be discharged through an aperture in said cupped tubular member and through an overflow tube.

7. The cap structure of claim 6 further characterized by a spring being biased against said push rod urging the push rod toward said flexible diaphragm.

8. The structure of claim 6 further characterized by said spring between said cap and said outer margin of said body margin having a series of circumferentially spaced radially outwardly extending arms with some of said arms being engaged against said cap and other of said arms being engageable against the outer margin of said body margin.

9. The structure of claim 6 further characterized by said tubular spring cap being secured underneath housing flanges provided on said dished body housing.

10. The structure of claim 6 further characterized by said flexible diaphragm having a bulb-shaped depressible portion engageable with said push rod and having axially spaced radially extending annular flanges disposed on axially opposite sides of said annular flange and gripping said annular flange and sealing the cap opening.

*11. In a closure cap for attachment to a filling neck of an internal combustion engine radiator,*

*a closure member for detachable assembly on a neck of a radiator and having a central opening,*

*a resiliently deflectable diaphragm carried on said closure member and having diaphragm flanges engaged on axially opposite sides of said closure member in sealed assembly therewith,*

*a pressure valve suspended from an underside of said closure member,*

*a spring engaged between said pressure valve and said closure member urging said pressure valve into engagement with a radiator cap about a radiator opening enclosed within a filling neck,*

*a spring urged vacuum valve carried by said pressure valve for venting an interior of a radiator to atmospheric pressure through a vent in a filling neck upon the development of sub-atmospheric pressures in a radiator, and*

*lost motion type actuator means operatively disposed between said resiliently deflectable diaphragm and said vacuum valve with the diaphragm being manually depressible against said actuator means to open said vacuum valve and vent a radiator to atmosphere, the vacum valve being movable in an opposite direction upon actuation of said pressure valve with the lost motion occurring between the vacuum valve and the actuator means to minimize deflection of the resiliently deflectable diaphragm.*

*12. In a closure cap for attachment to a filling neck of an internal combustion engine radiator,*

*a closure member for detachable assembly on a neck of a radiator and having a central opening,*

*a resiliently deflectable diaphragm carried on said closure member and having diaphragm flanges engaged on axially opposite sides of said closure member in sealed assembly therewith,*

*a pressure valve suspended from an underside of said closure member,*

*a spring engaged between said pressure valve and said closure member urging said pressure valve into engagement with a radiator about a radiator opening enclosed within a filling neck,*

*a spring urged vacuum valve carried by said pressure valve for venting an interior of a radiator to atmospheric pressure through a vent in a filling neck upon the development of sub-atmospheric pressures in a radiator, and*

*actuator means including a push rod operatively disposed between said resiliently deflectable diaphragm and said vacuum valve with the diaphragm being manually depressible against said push rod to open said vacuum valve and vent a radiator to atmosphere.*

*13. In a closure cap for attachment to a filling neck of an internal combustion engine radiator,*

*a closure member for detachable assembly on a neck of a radiator and having a central opening,*

*a resiliently deflectable diaphragm carried on said closure member and having diaphragm flanges engaged on axially opposite sides of said closure member in sealed assembly therewith, the closure member hav-*

*ing a bulb-shaped depressible portion movable relative to said diaphragm flanges and having an inner hollow cavity,*

*a pressure valve suspended from an underside of said closure member,*

*a spring engaged between said pressure valve and said closure member urging said pressure valve into engagement with a radiator about a radiator opening enclosed within a filling neck,*

*a spring urged vacuum valve suspended from an underside of said closure member in vertical alignment with said resiliently deflectable diaphragm for venting an interior of a radiator to atmospheric pressure through a vent in a filling neck upon the development of sub-atmospheric pressures in a radiator, and*

*actuator means including a push rod operatively disposed between said resiliently deflectable diaphragm and said vacuum valve with the push rod having an upper end in said inner hollow cavity and with the bulb-shaped depressible portion being manually depressible against said push rod to open said vacuum valve and vent a radiator to atmosphere.*

*14. In a closure cap for attachment to a filling neck of an internal combustion engine radiator,*

*a closure member for detachable assembly on a neck of a radiator and having a central opening,*

*a resiliently deflectable diaphragm carried on said closure member and having diaphragm flanges engaged on axially opposite sides of said closure member in sealed assembly therewith,*

*a pressure valve suspended from an underside of said closure member,*

*a spring engaged between said pressure valve and said closure member urging said pressure valve into engagement with a radiator about a radiator opening enclosed within a filling neck,*

*a spring urged vacuum valve carried by said pressure valve for venting an interior of a radiator to atmospheric pressure through a vent in a filling neck upon the development of sub-atmospheric pressures in a radiator, and*

*actuator means including a push rod operatively disposed between said resiliently deflectable diaphragm and said vacuum valve with the diaphragm being manually depressible against said push rod to open said vacuum valve and vent a radiator to atmosphere, the push rod having a lower end normally*

*spaced from said pressure valve to allow the pressure valve to be opened and moved upwardly along with the vacuum to avoid forcing the push rod upwardly against the diaphragm.*

*15. In a closure cap for attachment to a filling neck of an internal combustion engine radiator,*

*a closure member for detachable assembly on a neck of a radiator and having a central opening,*

*a resiliently deflectable diaphragm carried on said closure member and having diaphragm flanges engaged on axially opposite sides of said closure member in sealed assembly therewith,*

*a pressure valve suspended from an underside of said closure member,*

*a spring engaged between said pressure valve and said closure member urging said pressure valve into engagement with a radiator about a radiator opening enclosed within a filling neck,*

*a spring urged vacuum valve suspended from an underside of said closure member in vertical alignment with said resiliently deflectable diaphragm for venting an interior of a radiator to atmospheric pressure through a vent in a filling neck upon the development of sub-atmospheric pressures in a radiator,*

*actuator means including a push rod operatively disposed between said resiliently deflectable diaphragm and said vacuum valve with the diaphragm being manually depressible against said push rod to open said vacuum valve and vent a radiator to atmosphere, and*

*spring means operatively connected with said push rod urging the push rod upwardly against the diaphragm causing a bulb-shaped portion of the diaphragm to protrude through said central opening from a top side of said closure member.*

References Cited in the file of this patent or the original patent

UNITED STATES PATENTS

| | | |
|---|---|---|
| 2,197,178 | Gates | Apr. 16, 1940 |
| 2,584,883 | Karsch | Feb. 5, 1952 |
| 2,591,562 | Levell | Apr. 1, 1952 |
| 2,773,150 | Wintle | Dec. 4, 1956 |

FOREIGN PATENTS

| | | |
|---|---|---|
| 553,444 | Italy | Dec. 27, 1956 |